United States Patent
Kapinos et al.

(10) Patent No.: US 11,234,123 B2
(45) Date of Patent: Jan. 25, 2022

(54) OBSCURING APPLICATION WINDOWS BASED ON USER SECURITY PERMISSIONS

(71) Applicant: LENOVO (Singapore) PTE. LTD., New Tech Park (SG)

(72) Inventors: Robert J. Kapinos, Durham, NC (US); Kenneth Seethaler, Raleigh, NC (US); Adam Jerome Cavenaugh, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/800,879

(22) Filed: Feb. 25, 2020

(65) Prior Publication Data

US 2021/0266734 A1 Aug. 26, 2021

(51) Int. Cl.
*H04W 12/02* (2009.01)
*G06F 21/32* (2013.01)
*G06F 21/84* (2013.01)
*G06K 9/00* (2006.01)
*H04W 12/69* (2021.01)

(52) U.S. Cl.
CPC .......... *H04W 12/02* (2013.01); *G06F 21/32* (2013.01); *G06F 21/84* (2013.01); *G06K 9/00295* (2013.01); *G06K 9/00617* (2013.01); *H04W 12/69* (2021.01); *G06F 2221/2137* (2013.01); *G06F 2221/2141* (2013.01)

(58) Field of Classification Search
CPC .......... G06F 21/32; G06F 21/84; G06F 21/31; G06F 21/00; G06K 9/00295; G06K 9/00617; H04W 12/02; H04W 12/69
See application file for complete search history.

(56) References Cited

U.S. PATENT DOCUMENTS

| | | | |
|---|---|---|---|
| 2014/0361986 A1* | 12/2014 | Won | H04N 5/23218 345/156 |
| 2016/0188973 A1* | 6/2016 | Ziaja | G06F 21/62 382/116 |
| 2017/0052751 A1* | 2/2017 | Aurongzeb | G06F 1/1643 |
| 2017/0063852 A1* | 3/2017 | Azar | G06F 21/32 |
| 2017/0177844 A1* | 6/2017 | Da Luz | G06F 21/31 |
| 2020/0134238 A1* | 4/2020 | Balakrishna | G06F 3/147 |

* cited by examiner

*Primary Examiner* — Jinsong Hu
*Assistant Examiner* — Farideh Madani
(74) *Attorney, Agent, or Firm* — Kunzler Bean & Adamson

(57) ABSTRACT

Apparatuses, methods, systems, and program products are disclosed for obscuring application windows based on user security permissions. An apparatus includes a processor and a memory that stores code executable by the processor. The code is executable by the processor to identify a user who is within a field of view of the camera relative to the display, determine one or more security permissions for the user in response to identifying the user, and obscure one or more application windows that are visible on the display that are not compliant with the user's one or more security permissions.

20 Claims, 5 Drawing Sheets

OBSCURING APPLICATION WINDOWS BASED ON USER SECURITY PERMISSIONS

FIELD

The subject matter disclosed herein relates to the display of application windows and more particularly relates to obscuring application windows based on user security permissions.

BACKGROUND

Users in open-space work environments may perform tasks or view documents/files that that are intended to be private, sensitive, and/or confidential. However, these tasks and/or documents/files may be visible to others within the user's open-space work environment who can see the user's display.

BRIEF SUMMARY

Apparatuses, methods, systems, and program products are disclosed for obscuring application windows based on user security permissions. An apparatus, in one embodiment, includes a processor and a memory that stores code executable by the processor. In certain embodiments, the code is executable by the processor to identify a user who is within a field of view of the camera relative to the display, determine one or more security permissions for the user in response to identifying the user, and obscure one or more application windows that are visible on the display that are not compliant with the user's one or more security permissions.

A method for obscuring application windows based on user security permissions, in one embodiment, identifying, by a processor, a user who is within a field of view of the camera relative to the display, determining one or more security permissions for the user in response to identifying the user, and obscuring one or more application windows that are visible on the display that are not compliant with the user's one or more security permissions.

A computer program product for obscuring application windows based on user security permissions, in one embodiment, includes a computer readable storage medium having program instructions embodied therewith. In certain embodiments, the program instructions are executable by a processor to cause the processor to identify a user who is within a field of view of the camera relative to the display, determine one or more security permissions for the user in response to identifying the user, and obscure one or more application windows that are visible on the display that are not compliant with the user's one or more security permissions.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
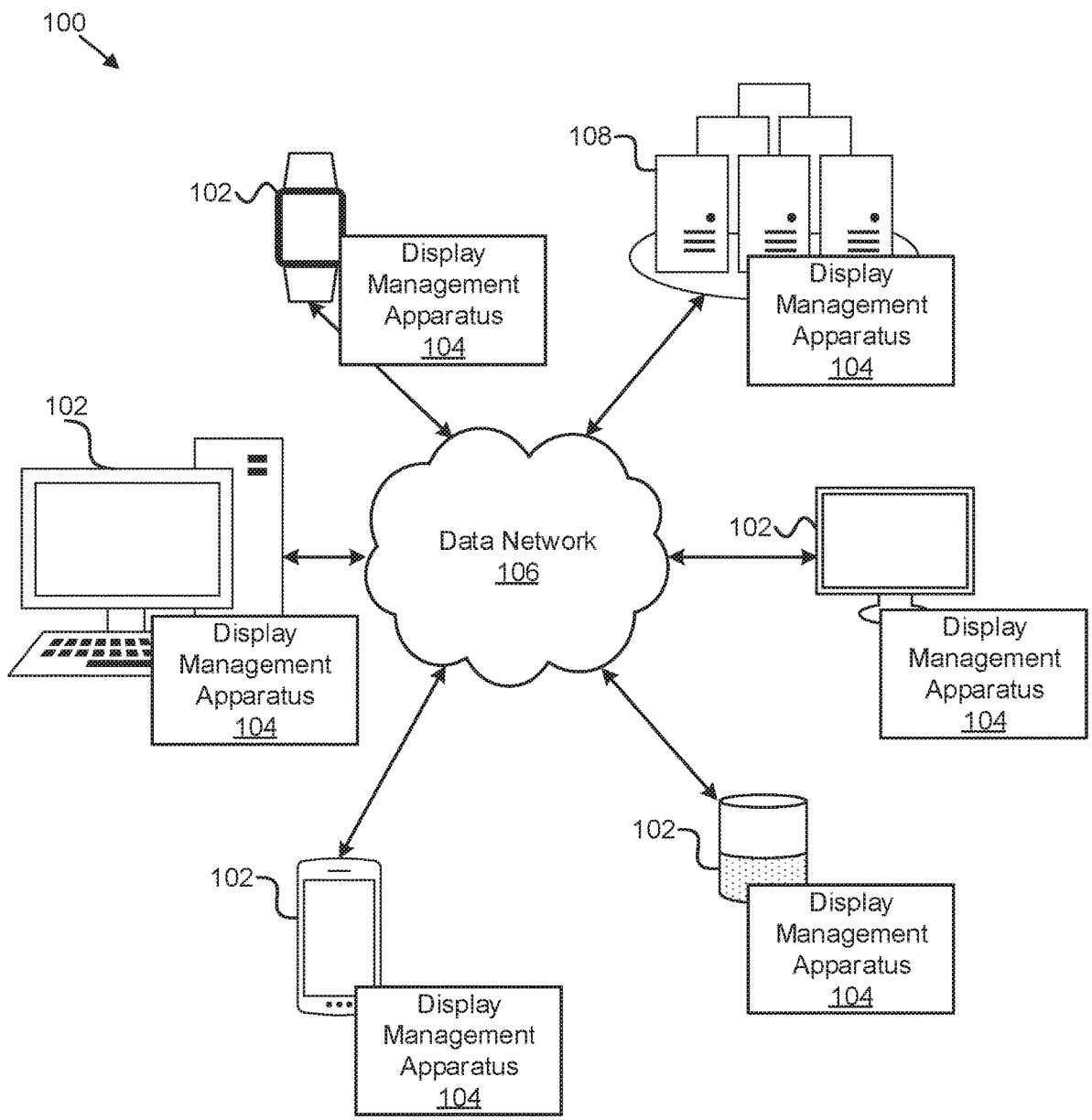
FIG. 1 is a schematic block diagram illustrating one embodiment of a system for obscuring application windows based on user security permissions.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor. In certain embodiments, the code is executable by the processor to identify a user who is within a field of view of the camera relative to the display, determine one or more security permissions for the user in response to identifying the user, and obscure one or more application windows that are visible on the display that are not compliant with the user's one or more security permissions.

In one embodiment, the code is executable by the processor to cross-reference the user's identity with an organizational directory to determine the one or more security permissions for the user. In certain embodiments, the one or more security permissions for the user are defined based on one or more of an organization, a domain, and a group that the user is a member of such that the one or more application windows are obscured in response to determining that the user is not a member of one or more of an organization, a domain, and a group associated with the application window.

In further embodiments, the code is executable by the processor to determine one or more of an organization, a domain, and a group that an application window is associated with based on one or more of a title of the application window, an owner of the application window, a type of file that is open within the application window, and a class of the application window. In some embodiments, the code is executable by the processor to obscure the one or more application windows by hiding the one or more application windows so that the application windows are not visible on the display.

In one embodiment, the one or more application windows are hidden by one or more of minimizing the one or more application windows and moving the one or more application windows out of a viewable area of the display. In some embodiments, the code is executable by the processor to obscure the one or more application windows by blurring a portion of the display where the one or more application windows are located.

In various embodiments, the code is executable by the processor to restore the one or more application windows that are obscured in response to detecting that the user is no longer in the field of view of the camera. In some embodiments, the code is executable by the processor to identify the user in response to determining that the user's eye gaze is directed at the display.

In one embodiment, the code is executable by the processor to start a timer for a predefined period of time in response to detecting the user is within a field of view of the camera and identify the user in response to the user not moving out of the field of view of the camera before the timer expires.

In certain embodiments, the code is executable by the processor to identify a plurality of users who are within a field of view of the camera, determine security permissions for each of the plurality of users, and obscure application windows that are visible on the display that are not compliant with overlapping security permissions for the plurality of users. In one embodiment, the code is executable by the processor to override obscuring the one or more application windows that are visible on the display in response to receiving an override command.

In one embodiment, the code is executable by the processor to obscure each application window that is visible on the display in response to not identifying the user who is within the field of view of the camera. In further embodiments, the display comprises one of a plurality of displays presenting a same view of application windows and the camera comprises one of a plurality of cameras that are associated with the plurality of displays so that the one or more application windows are obscured on one of the plurality of displays while not being obscured on a different one of the plurality of displays.

A method for obscuring application windows based on user security permissions, in one embodiment, identifying, by a processor, a user who is within a field of view of the camera relative to the display, determining one or more security permissions for the user in response to identifying the user, and obscuring one or more application windows that are visible on the display that are not compliant with the user's one or more security permissions.

In one embodiment, the method includes cross-referencing the user's identity with an organizational directory to determine the one or more security permissions for the user. In further embodiments, the one or more security permissions for the user are defined based on one or more of an organization, a domain, and a group that the user is a member of such that the one or more application windows are obscured in response to determining that the user is not a member of one or more of an organization, a domain, and a group associated with the application window.

In some embodiments, the method includes determining one or more of an organization, a domain, and a group that an application window is associated with based on one or more of a title of the application window, an owner of the application window, a type of file that is open within the application window, and a class of the application window. In some embodiments, the method includes restoring the one or more application windows that are obscured in response to detecting that the user is no longer in the field of view of the camera.

A computer program product for obscuring application windows based on user security permissions, in one embodiment, includes a computer readable storage medium having program instructions embodied therewith. In certain embodiments, the program instructions are executable by a processor to cause the processor to identify a user who is within a field of view of the camera relative to the display, determine one or more security permissions for the user in response to identifying the user, and obscure one or more application windows that are visible on the display that are not compliant with the user's one or more security permissions.

FIG. 1 is a schematic block diagram illustrating one embodiment of a system 100 for obscuring application windows based on user security permissions. In one embodiment, the system 100 includes one or more information handling devices 102, one or more display management apparatuses 104, one or more data networks 106, and one or more servers 108. In certain embodiments, even though a specific number of information handling devices 102, display management apparatuses 104, data networks 106, and servers 108 are depicted in FIG. 1, one of skill in the art will recognize, in light of this disclosure, that any number of information handling devices 102, display management apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In certain embodiments, the information handling devices 102 include cameras for capturing image and video data and displays for presenting graphical information such as application windows. As used herein, an application window may refer to a graphical interface element that is presented on a display for presenting content on the display. An application window may be created, generated, or the like by the application associated with the window such as Microsoft Word® for presenting word processor documents, a web browser window for presenting web pages, and/or the like.

In one embodiment, the display management apparatus 104 is configured to identify a user who is within a field of view of a camera relative to a display, determine one or more security permissions for the user in response to identifying the user, and obscure one or more application windows that are visible on the display that are not compliant with the user's one or more security permissions. The display management apparatus 104, including its various sub-modules, may be located on one or more information handling devices 102 in the system 100, one or more servers 108, one or more network devices, and/or the like. The display management apparatus 104 is described in more detail below with reference to FIGS. 2 and 3.

In various embodiments, the display management apparatus 104 may be embodied as part of an information handling device 102 such as a smart device, a network device, an Internet of Things device, a computing device, or as a hardware appliance that can be installed or deployed on an information handling device 102, on a server 108, on a user's mobile device, on a display, or elsewhere on the data network 106. In certain embodiments, the display management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the display management apparatus 104 may include a power interface, a wired and/or wireless network interface, a graphical interface that attaches to a display, and/or a semiconductor integrated circuit device as described below, configured to perform the functions described herein with regard to the display management apparatus 104.

The display management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the display management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the display management apparatus 104.

The semiconductor integrated circuit device or other hardware appliance of the display management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the display management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may host, store, stream, or the like files and content to a different device such as documents, videos, music, podcasts, images, games, web pages, augmented and/or virtual reality environments, and/or the like.

Figure 2:
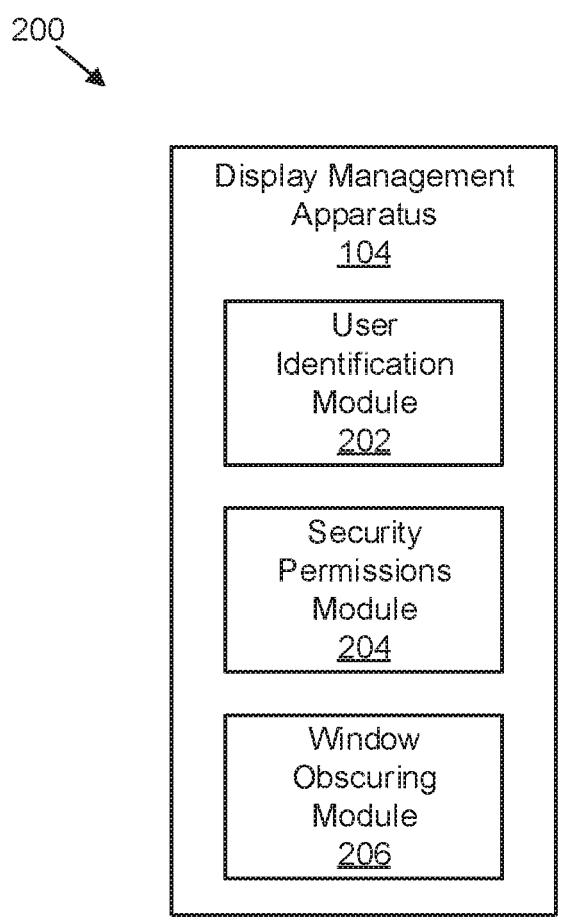
FIG. 2 is a schematic block diagram illustrating one embodiment of an apparatus for obscuring application windows based on user security permissions.

FIG. 2 is a schematic block diagram illustrating one embodiment of an apparatus 200 for obscuring application windows based on user security permissions. In one embodiment, the apparatus 200 includes an instance of a display management apparatus 104. In one embodiment, the display management apparatus 104 includes one or more of a user identification module 202, a security permissions module 204, and a window obscuring module 206, which are described in more detail below.

In one embodiment, the user identification module 202 is configured to identify a user who is within a field of view of the camera relative to the display. In one embodiment, an information handling device 102 may have a camera that has a field of view that faces the same or substantially the same direction as a display that is connected to the information handling device 102—such as a web cam or other front-facing camera.

In certain embodiments, the user identification module 202 receives image and/or video data that the camera captures and processes the data to detect faces or other characteristics of persons who are within the field of view of the camera. For instance, the user identification module 202 may use facial recognition processes to detect and identify users who are within a field of view of the camera, and therefore able to see the display and the content presented on the display.

In one embodiment, the user identification module 202 may identify a user in response to determining that the user's eye gaze is directed at the display. For instance, the user identification module 202 may determine whether the user is looking at or towards the camera and/or display prior to further processing the image/video data to determine an identity of the user. In this manner, if people are merely walking by display without looking towards the camera, the user identification module 202 does not waste processing cycles attempting to identify the users passing until the user's eye gaze is directed toward the camera/display.

The user identification module 202, in certain embodiments, accesses, checks, and/or references a user database, a facial recognition database, an employee directory, an organization directory, social media information, and/or the like to identify the user detected in the images/videos that the camera captures and that is looking towards the display. For instance, the user identification module 202 may cross-reference images of the user with an organizational directory to determine the user's name and/or other identifying information about the user.

In one embodiment, the security permissions module 204 is configured to determine one or more security permissions for the user in response to identifying the user. In one embodiment, the security permissions module 204 cross-references the user's identity with an organizational directory to determine the one or more security permissions for the user. The security permissions may specify what types of files or documents the user is allowed to view, edit, access, or the like. The security permissions may include different clearance levels such as classified, unclassified, public, and/or the like.

In one embodiment, the one or more security permissions for the user are defined by an organization, a domain, a group, and/or the like that the user is a member of. For instance, a user may work within a department in an organization that requires a certain security clearance level to work in the department. The user may have different security permissions for different types of files (e.g., .doc files, .xlsx files, .pdf files, .jpg files, etc.), different departments, different roles within the organization, and/or the like, which define the types of files the user can access and/or the actions that the user can take on those files, e.g., read/write/edit/etc.

In one embodiment, the window obscuring module 206 is configured to obscure one or more application windows that are visible on the display that are not compliant with the user's one or more security permissions. As explained above, an application window may comprise a graphical interface element that is spawned and/or owned by a process and is configured to delineate the boundaries of content presented for the process on the display. For example, a word processor may create an application window for viewing and editing a document on a display.

In one embodiment, the application window may include metadata that stores the title of the window, a description of the window, an owner (e.g., process) of the window, information related to content presented in the window (e.g., a filename, a file extension, a directory path for the file, and/or the like), an organization/domain/group that the application window is associated with, a class of the application window, security level information for the content and/or the window, and/or the like.

In one embodiment, the window obscuring module 206 obscures an application window in response to determining that a user onlooker is not a member of one or more of an organization, a domain, a group, and/or the like that is associated with the application window. For instance, an application window may be a PDF viewer that was opened in response to a user selecting a PDF document from Lenovo® to view, which may be included in the metadata for the application window (e.g., in the title of the application window). In such an embodiment, if the user identification module 202 detects and identifies a user looking towards the display and the security permissions module 204 determines that the user is not an employee of Lenovo® or a member of the department/group where the document is opened, the window obscuring module 206 may hide or otherwise obscure the document from view until the user is gone or no longer looking at the display.

Similarly, if the security permissions module 204 determines that a user looking at the display does not have a security clearance level or other permissions/authority to view a content element that is presented on the display, (e.g., based on the metadata of the application window—the application window may be opened by a program that requires a certain clearance level to access/use, the document may have been opened from a repository or storage location that requires a certain clearance level, the file itself may require a certain clearance level or credentials to access it, the file may have an extension that requires a certain clearance level, and/or the like), then the window obscuring module 206 may obscure the application window until the user is gone, e.g., no longer in the field of view of the camera/display.

In one embodiment, the window obscuring module 206 obscures the one or more application windows that are not compliant with the user's security permissions by hiding the one or more application windows so that the application windows are not visible on the display. For instance, the window obscuring module 206 may minimize the application windows, may move the application windows out of a viewable area of the display (e.g., off the screen), may cause the application windows to disappear, may move other application windows over the application windows that need to be obscured, may maximize other application windows so that the application windows that need to be obscured are not visible, and/or the like.

In further embodiments, the window obscuring module 206 obscures the one or more application windows by blurring a portion of the display where the one or more application windows are located so that the content is scrambled and not readable/understandable. In certain embodiments, the window obscuring module 206 may lock the device so that a login screen is displayed instead of the graphical desktop display presenting the application windows, may darken the display where the application windows are located so that they are not visible, may trigger a screen saver, may cause the application windows to move around at such a speed that the application windows are not readable or viewable, and/or the like.

In one embodiment, the window obscuring module 206 obscures each application window that is visible on the display in response to the user identification module 202 not identifying the user who is within the field of view of the camera. For instance, if the window obscuring module 206 does not find the user's identity in a directory, on a social media network, in an employee/organization chart, and/or the like, then the user may be a complete stranger and the window obscuring module 206 prevents the user from viewing any application windows on the display.

In one embodiment, the user identification module 202 detects and identifies a plurality of users who are within a field of view of the camera. In such an embodiment, the security permissions module 204 determines security permissions for each of the identified users and the window obscuring module 206 obscures application windows that are visible on the display that are not compliant with overlapping security permissions for the plurality of users.

For example, if the user identification module 202 detects and identifies three users who are looking at the display (e.g., are within the field of view of the camera and are looking towards the camera), the security permissions module 204 determines each of the users security permissions and determines where their security permissions overlap (e.g., are the same). The window obscuring module 206, in such an example embodiment, obscures application windows that are not compliant with the three users' overlapping security permissions.

In one embodiment, a system may include a plurality of different, external displays that are connected to a computing device, e.g., a projector or monitor in a conference room that is connected to a laptop or tablet computer such that the application windows that are presented on the display of the computing device are also presented on the external displays. Furthermore, there may be cameras associated with the displays, e.g., a camera above a projector screen or monitor in a conference room.

In such a configuration, the user identification module 202 may detect and identify users who are within the field of view of the cameras associated with the external displays and the security permissions module 204 may determine the security permissions of the identified users. Based on the security permissions, the window obscuring module 206 may obscure one or more application windows on the external display, e.g., application windows where the users' security permissions do not overlap, while keeping the application windows visible on other displays that the users are not looking at, e.g., on a main display for the device that is connected to the external display.

Figure 3:
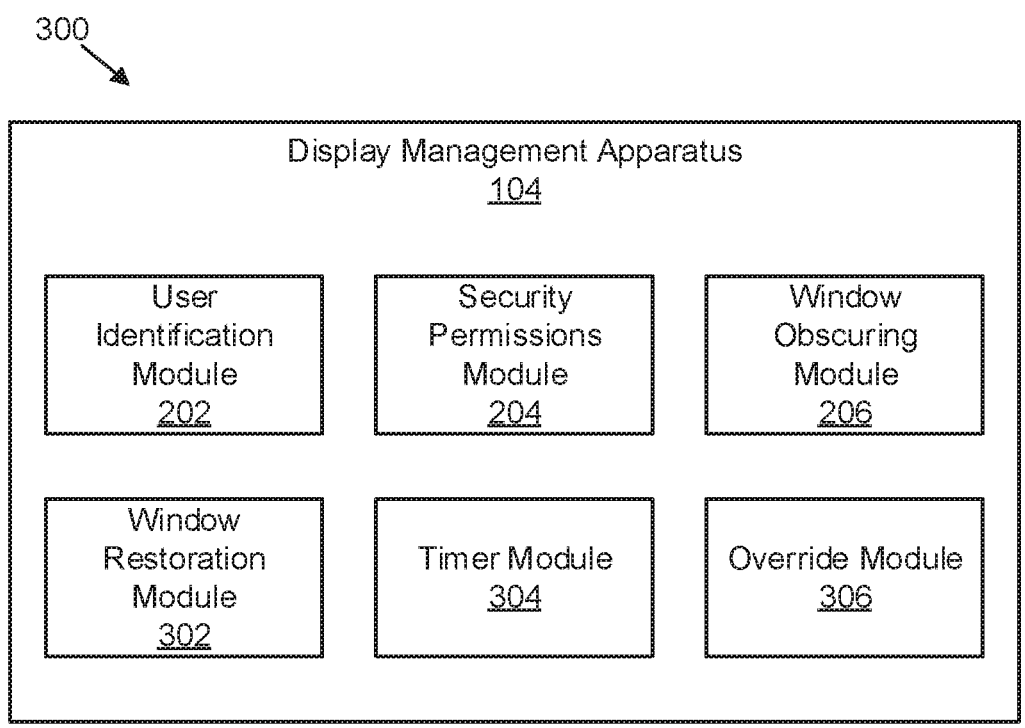
FIG. 3 is a schematic block diagram illustrating one embodiment of another apparatus for obscuring application windows based on user security permissions.

FIG. 3 is a schematic block diagram illustrating one embodiment of another apparatus 300 for obscuring application windows based on user security permissions. In one embodiment, the apparatus 300 includes an instance of a display management apparatus 104. The display management apparatus 104, in certain embodiments, includes a user identification module 202, a security permissions module 204, and a window obscuring module 206, which may be substantially similar to the user identification module 202, the security permissions module 204, and the window obscuring module 206 described above with reference to FIG. 2. The display management apparatus 104, in further embodiments, includes one or more of a window restoration module 302, a timer module 304, and an override module 306, which are described in more detail below.

In one embodiment, the window restoration module 302 is configured to restore the one or more application windows that are obscured in response to detecting that the user that a caused the application windows to be obscured is no longer in the field of view of the camera. For example, the user identification module 202 may detect that the user who has security permissions that are not compliant with one or more of the displayed application windows is no longer within the field of view of the camera, based on image/video data that the camera captures, and the window restoration module 302 may restore the obscured application windows to their states prior to being obscured.

For instance, the window restoration module 302 may unhide and/or position application windows back to where they were prior to being hidden, minimized, or moved out of the visible area of the display. In other instances, the window restoration module 302 may unblur or make clearly visible application windows that were blurred, darkened, or otherwise made difficult to view.

In one embodiment, the timer module 304 is configured to start a timer for a predefined period of time in response to detecting a user is within a field of view of the camera. For instance, the timer module 304 may begin a timer for one second, 500 microseconds, 500 milliseconds, or the like when the user identification module 202 first detects a user move into the field of view of the camera. At the expiration of the timer, the user identification module 202 captures image/video data of the user using the camera and determines the identity of the user. In this manner, the user identification module 202 is not constantly attempting to identify users who may just be passing by without noticing or looking at the display.

In further embodiments, the timer module 304 may not start the timer until the user identification module 202 determines that a user is looking at or towards the camera/display, based on the user's eye gaze. In this instance, if a user is merely walking past the display without noticing it or looking at it, then there is no need for the user identification module 202 to attempt to determine the identity of the user.

In one embodiment, the override module 306 is configured to override obscuring the one or more application windows that are visible on the display in response to receiving an override command. The override command, for instance, may be a key press on a keyboard, a click of a mouse button, a touch on a touch screen, a gesture, selection of a blurred or minimized application window, a voice command, and/or the like. For example, a user may unhide an application window for another user who may not have security permissions that are compliant with the application window by pressing the "Enter" key, by clicking on the obscured application window with a cursor, by providing a voice command, hand, or touch gesture, and/or the like. A user may restore the application window to its obscured state by providing the same override command or a different command to obscure the window.

Figure 4:
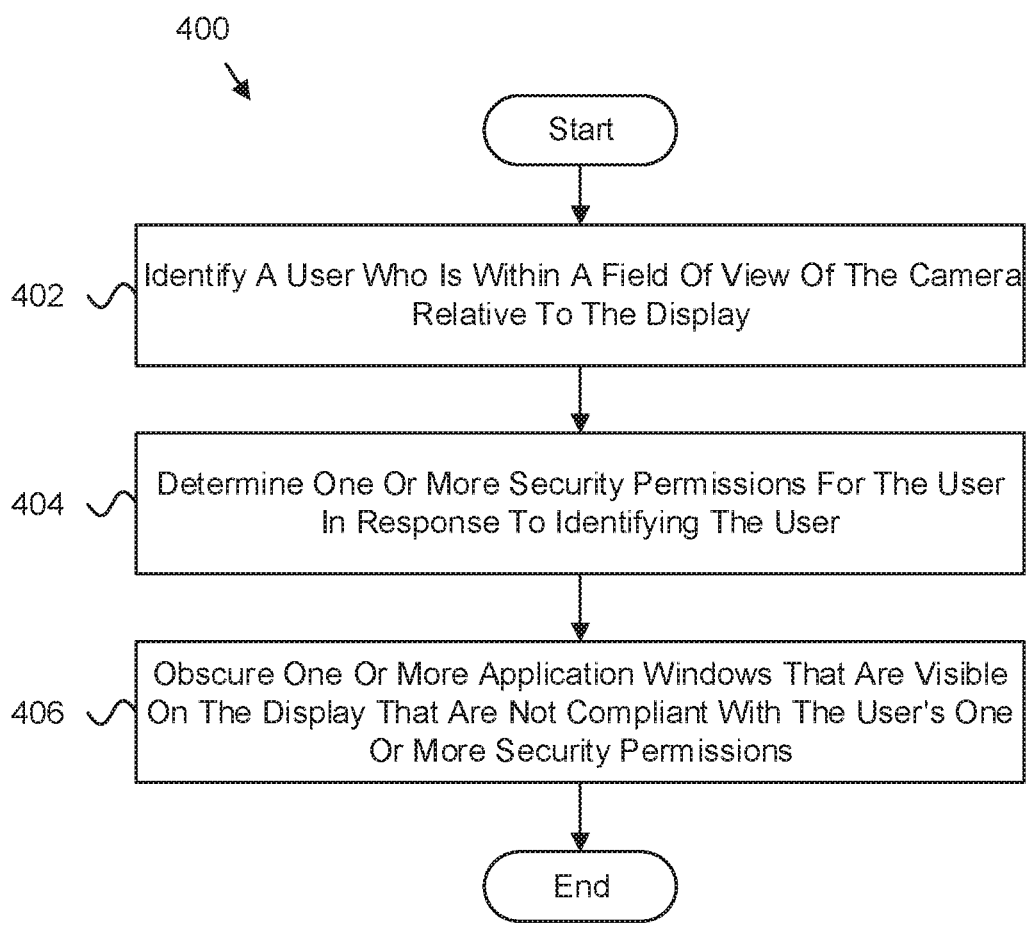
FIG. 4 is a schematic flow chart diagram illustrating one embodiment of a method for obscuring application windows based on user security permissions.

FIG. 4 is a schematic flow chart diagram illustrating one embodiment of a method 400 for obscuring application windows based on user security permissions. In one embodiment, the method 400 begins and identifies 402 a user who is within a field of view of the camera relative to the display. In further embodiments, the method 400 determines 404 one or more security permissions for the user in response to identifying the user.

In certain embodiments, the method 400 obscures 406 one or more application windows that are visible on the display that are not compliant with the user's one or more security permissions, and the method 400 ends. In one embodiment, the user identification module 202, the security permissions module 204, and the window obscuring module 206 perform the various steps of the method 400.

Figure 5:
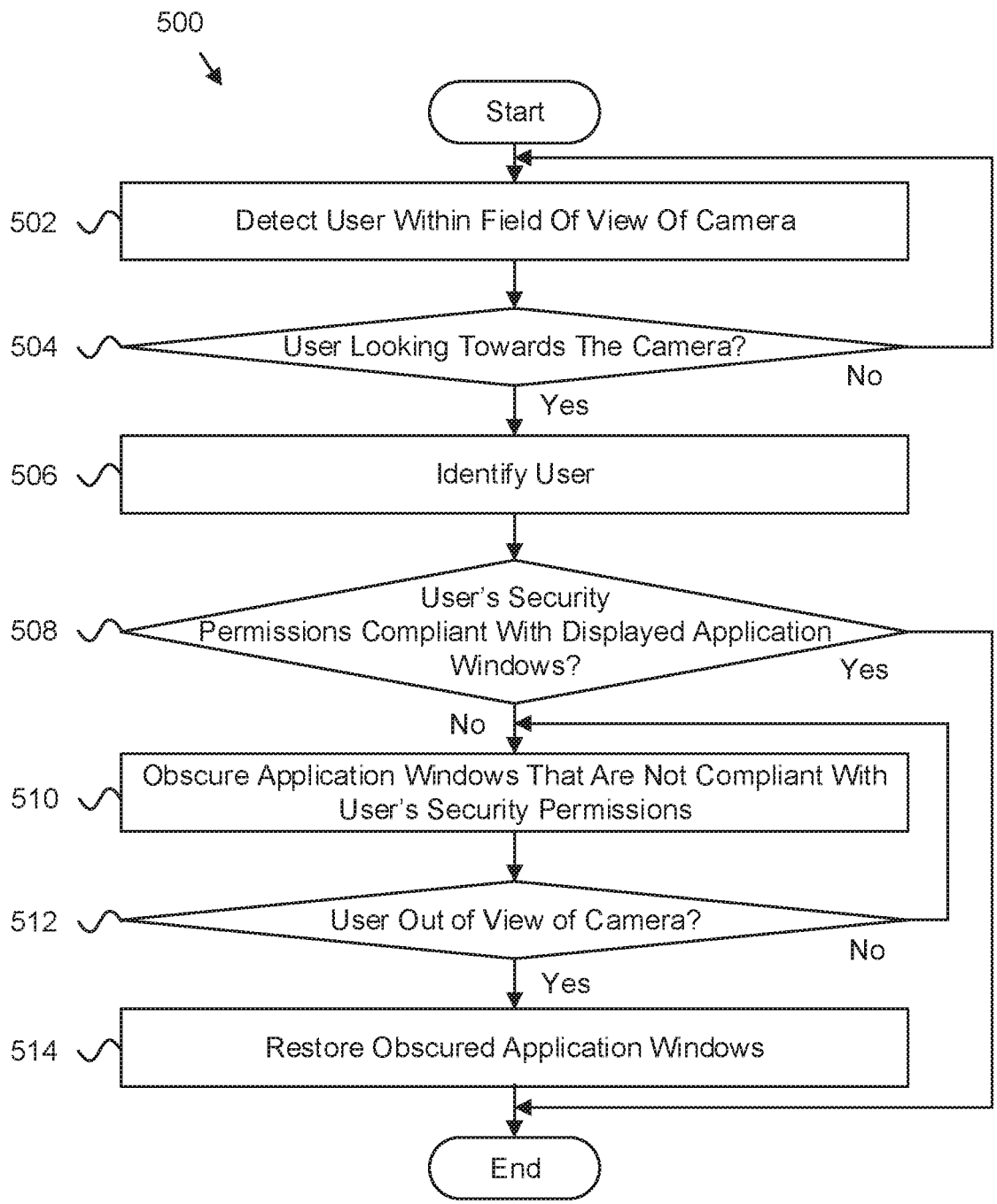
FIG. 5 is a schematic flow chart diagram illustrating one embodiment of another method for obscuring application windows based on user security permissions.

FIG. 5 is a schematic flow chart diagram illustrating one embodiment of another method 500 for obscuring application windows based on user security permissions. In one embodiment, the method 500 begins and detects 502 a user is within a field of view of a camera associated with a display. In some embodiments, the method 500 determines 504 whether the user is looking towards the camera. If not, the method 500 continues to detect 502 users who are within a field of view of the camera.

Otherwise, in one embodiment, the method 500 identifies 506 the user based on image/video data from the camera. In further embodiments, the method 500 determines 508 whether the identified user's security permissions are compliant with application windows that are presented on the display. If so, then the method 500 ends.

Otherwise, the method 500, in certain embodiments, obscures 510 application windows presented on the display that are not compliant with the user's security permissions. The method 500, in one embodiment, determines 512 whether the user is out of the field of view of the camera. If not, the method 500 continues to obscure 510 the application windows while the user is within the field of view of the camera.

Otherwise, in one embodiment, if the method 500 determines 512 that the user is out of view of the camera, the method 500 restores 514 the obscured application windows so that they are no longer obscured from view, and the method 500 ends. In one embodiment, the user identification module 202, the security permissions module 204, the window obscuring module 206, and the window restoration module 302 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor; and
   a memory that stores code executable by the processor to:
      detect, via a camera, that a user is located within a field of view of the camera relative to a display;
      determine whether the detected user is looking at the display;
      in response to determining that the detected user is looking at the display, start a timer for a predefined period of time;
      in response to determining that the detected user not looking at the display, delay start of the timer for the predefined period of time until it is determined that the user is looking at the display;
      in response to determining that the detected user is still located within the field of view of the camera at expiration of the timer and that the detected user is looking at the camera:
         identify the detected user that is within the field of view of the camera;
         determine one or more security permissions for the detected user in response to identifying the detected user; and
         obscure one or more application windows that are visible on the display that are not compliant with the detected user's one or more security permissions.

2. The apparatus of claim 1, wherein the code is executable by the processor to cross-reference the detected user's identity with an organizational directory to determine the one or more security permissions for the detected user.

3. The apparatus of claim 1, wherein the one or more security permissions for the detected user are defined based on one or more of an organization, a domain, and a group that the detected user is a member of such that the one or more application windows are obscured in response to determining that the detected user is not a member of one or more of an organization, a domain, and a group associated with the application window.

4. The apparatus of claim 3, wherein the code is executable by the processor to determine one or more of an organization, a domain, and a group that an application window is associated with based on one or more of a title of the application window, an owner of the application window, a type of file that is open within the application window, and a class of the application window.

5. The apparatus of claim 1, wherein the code is executable by the processor to obscure the one or more application windows by hiding the one or more application windows so that the application windows are not visible on the display.

6. The apparatus of claim 5, wherein the one or more application windows are hidden by one or more of minimizing the one or more application windows and moving the one or more application windows out of a viewable area of the display.

7. The apparatus of claim 1, wherein the code is executable by the processor to obscure the one or more application windows by blurring a portion of the display where the one or more application windows are located.

8. The apparatus of claim 1, wherein the code is executable by the processor to restore the one or more application windows that are obscured in response to detecting that the detected user is no longer in the field of view of the camera.

9. The apparatus of claim 1, wherein the code is executable by the processor to:
 identify a plurality of detected users who are within a field of view of the camera;
 determine security permissions for each of the plurality of detected users; and
 obscure application windows that are visible on the display that are not compliant with overlapping security permissions for the plurality of detected users.

10. The apparatus of claim 1, wherein the code is executable by the processor to override obscuring the one or more application windows that are visible on the display in response to receiving an override command.

11. The apparatus of claim 1, wherein the code is executable by the processor to obscure each application window that is visible on the display in response to not identifying the detected user who is within the field of view of the camera.

12. The apparatus of claim 1, wherein the display comprises one of a plurality of displays presenting a same view of application windows and the camera comprises one of a plurality of cameras that are associated with the plurality of displays so that the one or more application windows are obscured on one of the plurality of displays while not being obscured on a different one of the plurality of displays.

13. A method, comprising:
 detecting, using a camera, that a user is located within a field of view of the camera relative to a display;
 determining whether the detected user is looking at the display;
 in response to determining that the detected user is looking at the display, starting a timer for a predefined period of time;
 in response to determining that the detected user not looking at the display, delaying start of the timer for the predefined period of time until determining that the detected user is looking at the display; and
 in response to determining that the detected user is still located within the field of view of the camera at expiration of the timer:
  identifying, by a processor, the detected user that is within the field of view of the camera;
  determining one or more security permissions for the detected user in response to identifying the detected user; and
  obscuring one or more application windows that are visible on the display that are not compliant with the detected user's one or more security permissions.

14. The method of claim 13, further comprising cross-referencing the detected user's identity with an organizational directory to determine the one or more security permissions for the user.

15. The method of claim 13, wherein the one or more security permissions for the detected user are defined based on one or more of an organization, a domain, and a group that the detected user is a member of such that the one or more application windows are obscured in response to determining that the detected user is not a member of one or more of an organization, a domain, and a group associated with the application window.

16. The method of claim 15, further comprising determining one or more of an organization, a domain, and a group that an application window is associated with based on one or more of a title of the application window, an owner of the application window, a type of file that is open within the application window, and a class of the application window.

17. The method of claim 13, further comprising restoring the one or more application windows that are obscured in response to detecting that the detected user is no longer in the field of view of the camera.

18. The method of claim 13, wherein obscuring the one or more application windows that are visible on the display comprises hiding the one or more application windows so that the one or more application windows are not visible on the display.

19. The method of claim 13, wherein obscuring the one or more application windows that are visible on the display comprises blurring a portion of the display where the one or more application windows are located.

20. A computer program product, comprising a non-transitory computer-readable storage medium including program instructions embodied therewith, the program instructions executable by a processor to cause the processor to:
 detect, using a camera, that a user is located within a field of view of the camera relative to a display;
 determine whether the detected user is looking at the display;
 in response to determining that the detected user is looking at the display, start a timer for a predefined period of time;
 in response to determining that the detected user not looking at the display, delay start of the timer for the predefined period of time until determining that the detected user is looking at the display; and
 in response to determining that the detected user is still located within the field of view of the camera at expiration of the timer:
  identify the detected user that is within the field of view of the camera;
  determine one or more security permissions for the detected user in response to identifying the detected user; and
  obscure one or more application windows that are visible on the display that are not compliant with the detected user's one or more security permissions.

* * * * *